Figure 1:
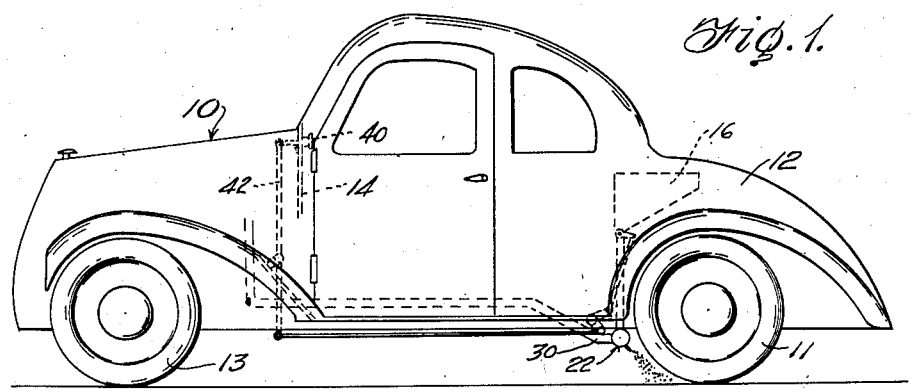

April 11, 1939.  H. M. LEGOFF ET AL  2,154,340

TRACTION ATTACHMENT FOR VEHICLES

Filed May 23, 1938  2 Sheets-Sheet 1

Inventors
HIRAM M. LeGOFF,
MYRON LAIT,

By Kimmel & Crowell
Attorneys

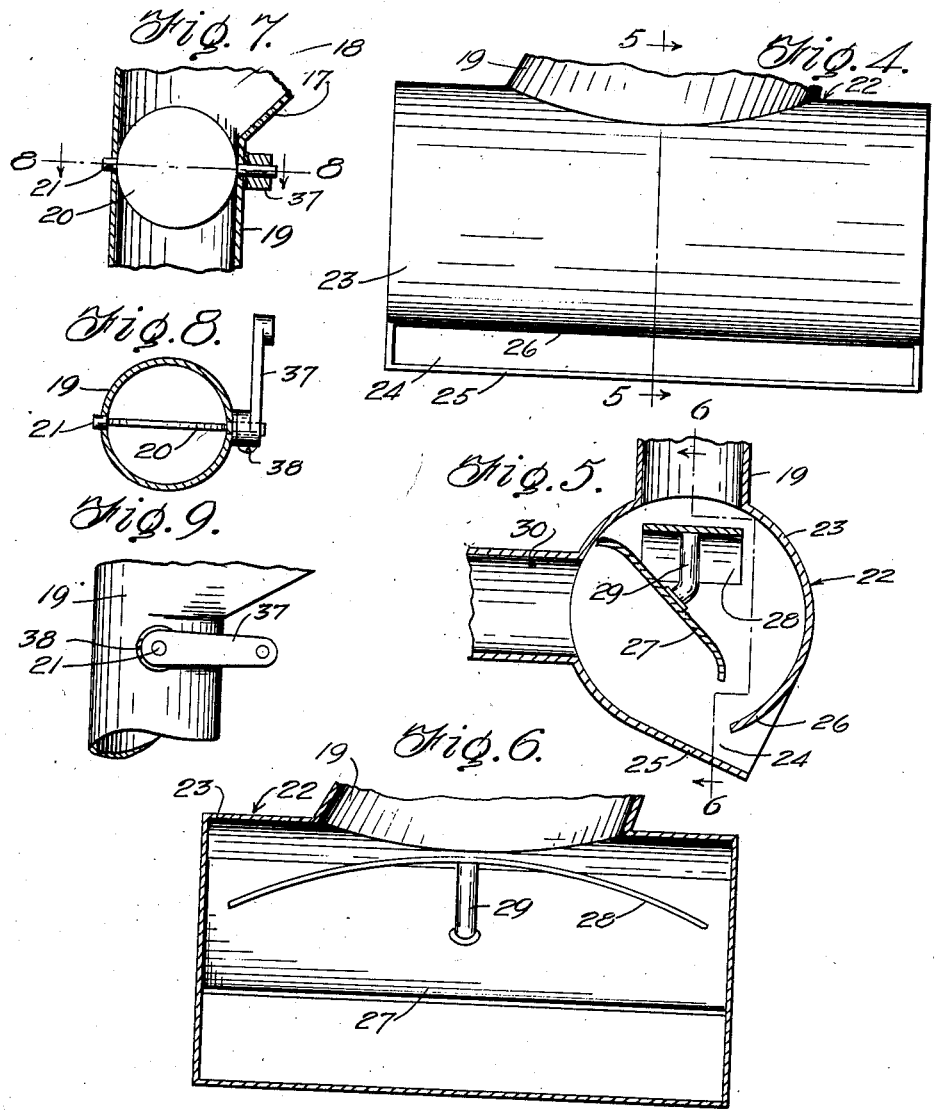

Patented Apr. 11, 1939

2,154,340

UNITED STATES PATENT OFFICE 2,154,340

TRACTION ATTACHMENT FOR VEHICLES

Hiram M. Legoff and Myron Lait, Denmark, Maine

Application May 23, 1938, Serial No. 209,619

3 Claims. (Cl. 291—3)

This invention relates to motor vehicles and more particularly to an attachment in the form of a sanding means which may be attached to either passenger vehicles, trucks or the like.

An object of this invention is to provide a sanding means which is adapted to spread a ribbon of sand in front of a pair of wheels, preferably the rear wheels of the vehicle, so as to prevent slipping or skidding of the vehicle.

Another object of this invention is to provide in a sanding means of this kind, means whereby the moisture may be removed from the sand during the distribution thereof so that the sand will not clog in the distributor.

A further object of this invention is to provide a sanding means for a vehicle which is adapted to be positioned in the body of the vehicle with an operator positioned remote from the distributor and hopper and operatively connected to a valve controlling the flow of the sand.

Still another object of this invention is to provide in a distributor means for connecting the exhaust of the vehicle with the distributor so that the sand will not only be heated during the distribution thereof, but the force of the exhaust gases passing through the distributor will also act to forcibly discharge the sand from the distributor.

To the foregoing objects and others which may hereinafter appear, the invention consists of the novel construction, combination and arrangement of parts which may be specifically referred to and are as illustrated in the accompanying drawings wherein is shown an embodiment of the invention, but it is to be understood that changes, variations and modifications may be resorted to which fall within the scope of the invention as claimed.

Figure 2:
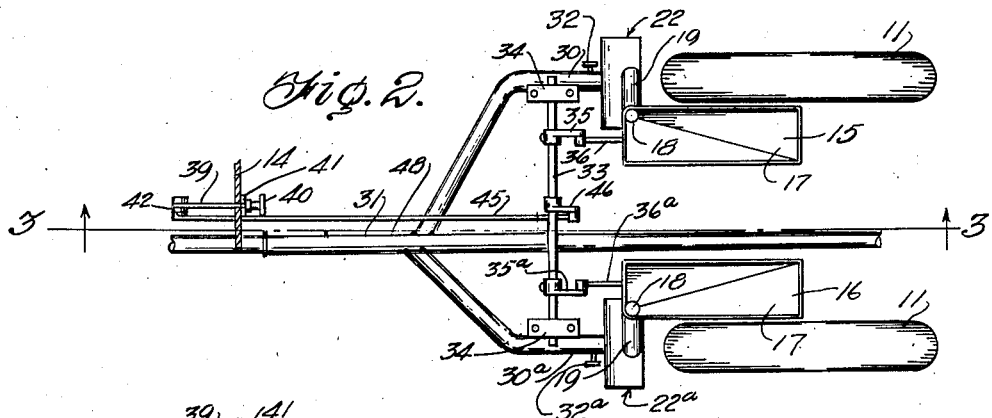
Figure 3:
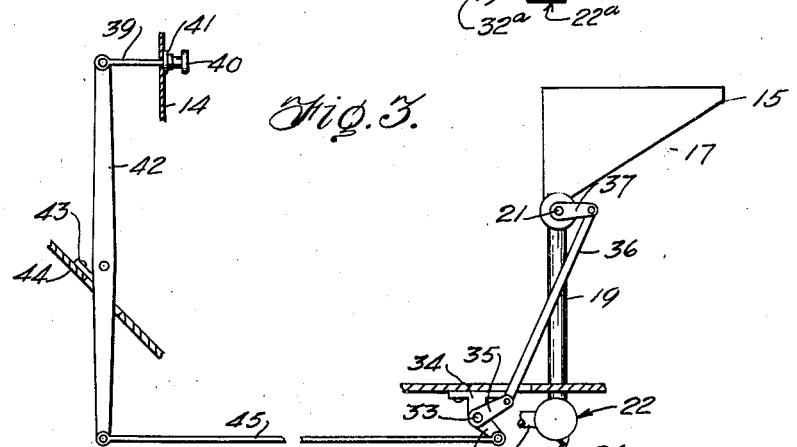

In the drawings:

Figure 1 is a side elevation of a motor vehicle having a sanding means constructed according to an embodiment of this invention mounted thereon, Figure 2 is a top plan of the sanding means removed from the vehicle but showing wheels of the vehicle rearwardly of the sand distributors, Figure 3 is a sectional view taken on the line 3—3 of Figure 2, Figure 4 is a detail rear elevation of one of the distributors, Figure 5 is a sectional view taken on the line 5—5 of Figure 4, Figure 6 is a sectional view taken on the line 6—6 of Figure 5, Figure 7 is a fragmentary vertical section showing the sand controlling valve positioned at the lower portion of the hopper, Figure 8 is a horizontal section taken on the line 8—8 of Figure 7, and Figure 9 is a fragmentary side elevation of the valve structure.

Referring to the drawings, the numeral 10 designates generally a motor vehicle which in the present instance is a passenger vehicle having front wheels 13 and rear wheels 11. The vehicle 10 in the present instance is provided with a rear compartment 12 which is positioned closely adjacent the rear seat of the vehicle and also includes a dash 14 forwardly of the driver's seat.

In order to provide a means whereby sand may be distributed forwardly of the rear wheels 11 in a pair of parallel ribbons, I have provided a pair of hopper members 15 and 16 which are disposed in the rear compartment 12 of the vehicle 10. The hoppers 15 and 16 are constructed substantially identical one with another, and each hopper is provided with a downwardly inclined bottom 17 which inclines to the forward end of the hopper 15 so as to provide an outlet 18. A pipe 19 is secured at its upper end to the outlet 18 of the hopper 15 and a butterfly valve 20 mounted on a shaft 21 is disposed in the pipe 19 adjacent the upper end thereof. The outlet pipe 19 is connected at its lower end to a distributor generally designated as 22. The distributor 22 comprises a substantially cylindrical member 23 which is provided with an opening 24 extending longitudinally thereof and a distributor spout or nozzle 25 is carried by the cylindrical member 23 and opens downwardly and rearwardly of the vehicle. The spout 25 confronts a rear wheel 11 and is positioned at a point slightly forwardly of the rear wheel 11 and in a plane substantially below the axial center of the wheel 11. One side or wall 26 of the cylindrical member 23 projects into the nozzle or spout 25 as shown in Figure 5 and comprises one portion of a spreading means for facilitating the spreading of the sand which is falling downwardly through the cylindrical member 23.

A longitudinally extending baffle plate 27 is secured at one edge thereof to the inner side of the cylindrical member 23 and is disposed on an inclination to the vertical and is preferably disposed on an obtuse angle to the vertical axis of the pipe 19. The lower edge of the baffle plate 27 is free and is disposed in spaced relation to the inwardly projecting lip or extension 26. A second or arcuate baffle member 28 is disposed in the distributor housing 23 and is supported in a position below the lower end of the pipe 19 by means of a supporting bracket or member 29 which is secured to the upper side of the baffle plate 27. The arcuate baffle 28 facilitates the spread of the sand which is dropping down through the pipe 19 so that this sand will be distributed on the surface of the road in a flat ribbon substantially equal to the length of the distributor member 22. A pipe 30 is secured at one end to the forward side of the distributor 23 and is connected at the opposite end to the exhaust pipe 31 of the vehicle. If desired, a valve member 32 may be interposed in the pipe 30 so that during normal vehicle operation the exhaust gases will pass directly out of the exhaust pipe 31. The exhaust gases are adapted to enter the forward side of the distributor 22 and strike the baffle plate 27 and then be directed downwardly and out through the outlet opening 24 of the spout or nozzle 25. The heat of the exhaust gases will serve as a means for removing moisture and preventing clogging of the nozzle 25 in addition to providing a means for forcibly ejecting the sand out of the nozzle 25.

The distributor 22a associated with the hopper 16 is connected to exhaust pipe 31 by means of a pipe 30a so that both distributors 22 and 22a will have the exhaust gases pass therethrough and assist in the ejection of the sand therefrom.

A shaft 33 extends transversely of the vehicle 10 and is rotatably carried thereby being mounted in bearings 34 which are secured to floor or other stationary part of the vehicle 10. A lever 35 is fixedly secured to the shaft 33 and a link 36 connects the free end of the lever 35 with a valve operating lever 37 which is secured to the shaft 21 as by a set screw 38. The valve associated with the hopper 16 is operated by means of a lever 35a which is connected to the valve lever by means of a link 36a. The valve associated with the hopper 16 is similar in every detail to the valve 20 and the parts associated therewith.

The shaft 33 is rocked by means of a pull rod or operating member 39 having a handle or knob 40 at one end thereof. The rod 39 is slidable through a bushing or bearing 41 fixed to the dash 14. A rock lever 42 is pivotally secured intermediate the ends thereof on a bearing 43 which is secured in the present instance to the upwardly inclined floor 44 of the vehicle. The pull rod 39 is secured to the upper end of the rock lever 42. A link 45 is secured at its forward end to the lower end of the lever 42. The rear end of the link 45 is secured to a crank or lever 46 which is fixedly secured to the shaft 33 between the levers or cranks 35 and 35a.

In the use and operation of this sanding device the sand is placed in each of the hoppers 15 and 16 and during normal operation, the valve members 20 are in closed position cutting off the flow of sand from the hoppers 15 and 16 to the distributors 22 and 22a. However, when it is desired to increase the traction of the wheels 11, the operator 40 is pulled rearwardly so as to rock the shaft 33 and swing the valve members 20 in open position. The valve members 32 and 32a are initially manually opened so that the exhaust gases will be permitted to discharge through the distributors 22 and 22a. The distributors 22 are preferably supported at the rear portion of the running boards and are of a length slightly greater than the greatest diameter of the tires on the wheels 11. In this manner a sufficiently wide ribbon of sand will be deposited beneath the moving wheels 11 so as to thereby prevent skidding or slipping of such wheels. The pressure of the exhaust gases will forcibly eject the sand out of the nozzles 25 in addition to the heat of the gases preventing the sand from clogging or accumulating at the discharge opening 24 of each nozzle. The downwardly moving sand which moves downwardly in the discharge pipe 19 will be spread out by the arcuate baffle or deflector 28 and this sand will then drop downwardly onto the upper surface of the flat or longitudinally extending baffle 27. The sand will then move off of the free end of the baffle 27 and strike the lip 26 and will then pass downwardly and out through the opening 24 of the nozzle 25. A sanding means constructed according to this invention may be readily attached to the present parts of a motor vehicle and can be operated at selected periods so that the operation of the vehicle will be facilitated in view of the fact that the condition of the road will not materially affect the movement in the desired direction of the vehicle.

The butterfly valve member 20 is so mounted with respect to the hopper 15 that when this valve is rocked to an open position, in which position the valve 20 is substantially vertical, the upper half of the valve will contact with the sand in the hopper 15 and initially agitate the sand so that the sand will not stick in the discharge opening 18. In this manner the movement of the valve 20 to an open position will assure a flow of sand from the hopper 15 to the distributor 22.

What we claim is:

1. A distributing nozzle for a vehicle sanding means comprising an elongated hollow body having an elongated discharge opening, a sand intake opening and an exhaust intake opening, a baffle in said body between said intake openings and inclined in the direction of said discharge opening, an edge of said baffle being spaced inwardly from said discharge opening, a second baffle in said body between said first baffle and said sand intake opening and positioned below said sand intake opening with the edges thereof spaced from the side walls of said body, and means secured to said first and second baffles supporting said second baffle relative to said first baffle.

2. A distributing nozzle for a vehicle sanding means comprising an elongated hollow body having an elongated discharge opening, a sand intake opening and an exhaust intake opening, a baffle in said body between said intake openings and inclined in the direction of said discharge opening, an edge of said baffle being spaced inwardly from said discharge opening, and a second baffle in said body above said first baffle and disposed below said sand intake opening with the edges thereof spaced from the side walls of said body for spreading the sand upon said first baffle.

3. A distributing nozzle for a vehicle sanding means comprising an elongated hollow body having an elongated discharge opening, a sand intake opening and an exhaust intake opening, a baffle in said body between said intake openings and inclined in the direction of said discharge opening, an edge of said baffle being spaced inwardly from said discharge opening, and a second baffle in said body above said first baffle and disposed below said sand intake opening with the edges thereof spaced from the side walls of said body for spreading the sand upon said first baffle, said second baffle being of longitudinally arcuate configuration with the convex side thereof confronting said sand intake opening.

HIRAM M. LEGOFF.
MYRON LAIT.